United States Patent [19]

London

[11] 3,768,193
[45] Oct. 30, 1973

[54] BRINE SHRIMP HARVESTING APPARATUS

[75] Inventor: S. Paul London, Palo Alto, Calif.

[73] Assignee: Metaframe Corporation, Maywood, N.J.

[22] Filed: Oct. 15, 1971

[21] Appl. No.: 189,522

[52] U.S. Cl. .................................................. 43/6.5
[51] Int. Cl. ............................................ A01k 71/00
[58] Field of Search ...................... 43/6.5, 4, 4.5, 8; 302/14; 198/213, 104

[56] References Cited
UNITED STATES PATENTS 1,777,783  10/1930  Burns et al............................ 43/6.5
1,138,541  5/1915  Conekin................................... 43/8

FOREIGN PATENTS OR APPLICATIONS 118,015  10/1969  Norway................................ 43/6.5
1,204,629  9/1970  Great Britain....................... 302/14

Primary Examiner—Warner H. Camp
Attorney—Abraham Friedman et al.

[57] ABSTRACT

Apparatus comprising a raft for floating along the surface of the body of water, the raft including a net for skimming the surface of the body of water and communicating with a sluice provided at the front end portion of the raft. A cylindrical screen extends partially into the sluice and communicates with the net for entrapping brine shrimp which are skimmed off the surface of the water by the net. The cylindrical screen includes an internal helical member which is coextensive therewith, the screen and helical member both being simultaneously rotated for helically conveying entrapped brine shrimp from the sluice to appropriate collection buckets provided on the top-side of the raft.

9 Claims, 5 Drawing Figures

S. PAUL LONDON
INVENTOR
BY Friedman and Goodman
ATTORNEYS

BRINE SHRIMP HARVESTING APPARATUS

BACKGROUND OF THE INVENTION

The present invention relates generally to the harvesting of small crustacean of the species Artemia commonly known as brine shrimp, hereafter referred to as shrimp, and more particularly to apparatus for continuously and automatically transferring shrimp from the surface of a shallow body of water into appropriate collection means.

As those skilled in the art readily understand, the conventional procedure for harvesting brine shrimp is to manually insert heavy and cumbersome nets into a body of water, along the surface thereof, from a raft or the like, so as to entrap shrimp concentrated generally along the surface of the body of water. Thereafter, the nets entrapped with the shrimp are manually lifted onto the raft and are emptied into appropriate buckets for temporary storage.

Obviously, the conventional procedure for harvesting shrimp is a tedious and cumbersome proposition since the nets are rather heavy and must be lifted from the confines of the water onto the raft and must be emptied manually into appropriate buckets. Shrimp are often lost as a result of the hiatus between changing the nets, since the nets require periodic emptying and, moreover, shrimp often spills from the nets onto the raft since it is rather difficult to properly empty the nets into appropriate buckets therefor.

SUMMARY OF THE INVENTION

Accordingly, it is an object of the present invention to provide apparatus for automatically and continuously transferring shrimp from a shrimp laden body of water into appropriate collection buckets.

It is another object of the present invention to obviate the necessity for emptying nets entrapped with shrimp into appropriate collection buckets.

It is still a further object of the present invention to obviate the necessity for intermittently changing nets after the nets have been fully entrapped with shrimp and thereby enhance the rate of harvesting shrimp without regard to the physical strength of shrimp harvesting personnel.

To this end, the present invention relates generally to apparatus for harvesting shrimp, the apparatus comprising a cylindrical conveyer screen in which is fixed a helical member, the screen and helical member being simultaneously rotatably driven and supported on a raft, the latter including a net for continuously skimming the surface of a shrimp laden body of water so as to transfer shrimp to the entrance of the cylindrical screen which is partially submerged and communicates with the net, thereby, permitting the helical member to elevate and expel shrimp continuously into appropriate collection buckets provided on the top-side of the raft.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of a preferred embodiment in which.

DETAILED DESCRIPTION OF THE INVENTION

Figure 1:
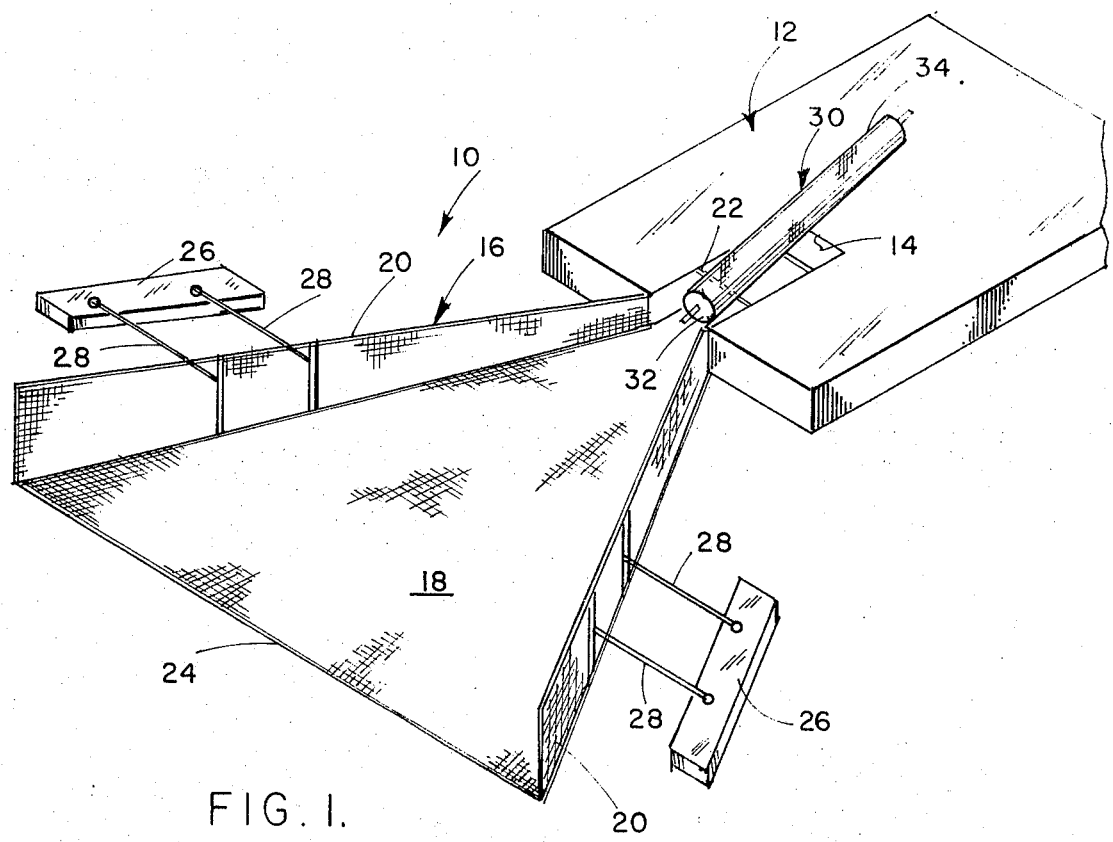
FIG. 1 illustrates a perspective view of a schematic representation of the apparatus for harvesting shrimp pursuant to the present invention.
Figure 2:
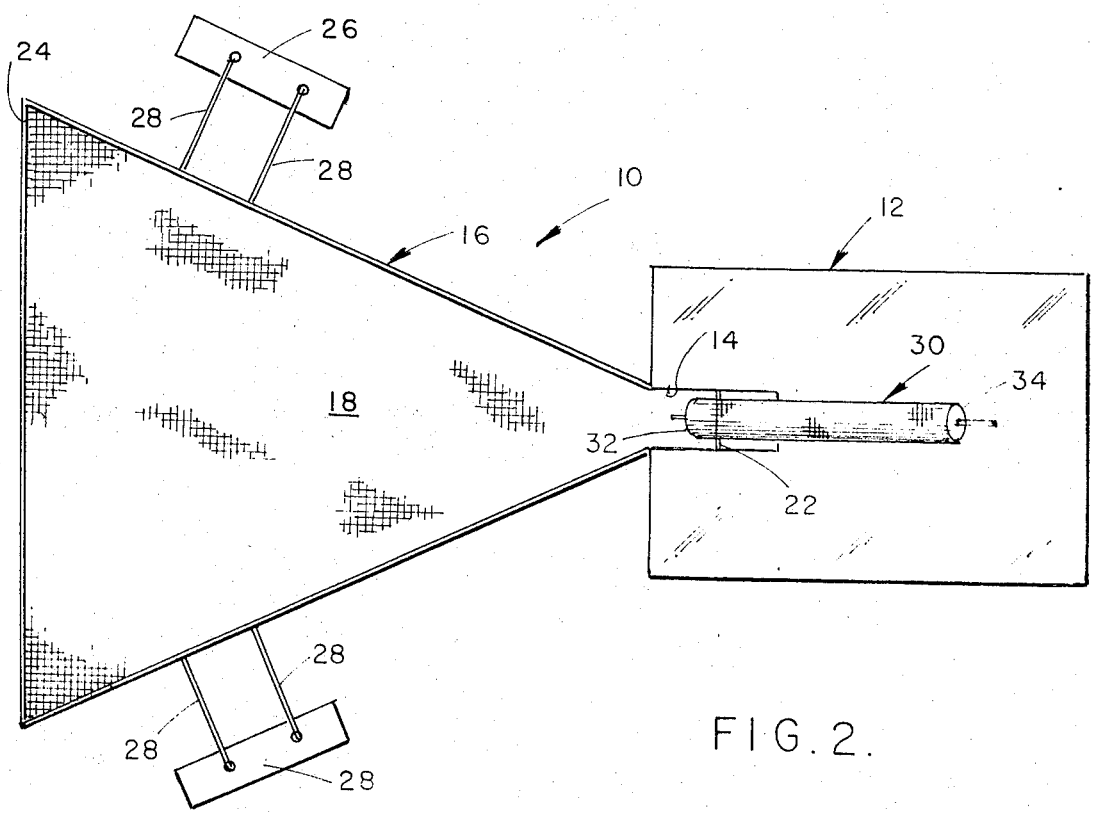
FIG. 2 illustrates a top side plan view of the apparatus illustrated in FIG. 1.

Referring now to the drawings, and more particularly to FIGS. 1 and 2 thereof, the present invention relates generally to apparatus for harvesting brine shrimp, the apparatus generally denoted by the reference character 10. The apparatus 10 includes a floatation raft 12 which is provided at the front end portion thereof with a sluice 14 or recess which is open at the front end of the raft.

Connected to the front end of the raft, such as by conventional means, is a water skimming net 16 having a base portion 18 and a pair of opposite upstanding side walls 20. An upstanding narrow rear wall 22 extends upwardly from the base portion 18 and is interposed in the sluice 14 of the raft 12. Moreover, the net 16 includes a wide open front portion 24 which is of greater extent than that of the narrow rear wall 22 such that the side walls 20 graudually taper inwardly toward one another from the wide open front portion 24 for skimming and entrapping shrimp to a narrow extent communicating with the sluice 14 for concentrating entrapped shrimp therein.

The raft 12 also includes a pair of pontoon-like floats 26 which are fixedly interconnected to the side walls 20 respectively such as by means of elongate lateral frame segments 28 respectively, the pontoon-like floats 26 acting to support and stablize the net 16 along the raft 12 and yet maintain the wide-open front portion 24 partially submerged along the surface of a body of water to permit skimming the surface and entrapping shrimp therein.

Rotatably supported upon the raft 12, such as by means as will be further clarified below, is a cylindrical conveyer screen 30 which has an axis of rotation inclined relative to the top side of the raft 12 such that the lower end portion 32 of the screen 30 projects into the sluice 14 and through an appropriate opening provided in the rear narrow wall 22 of the net 16 so as to also be partially submerged and communicate with the shrimp entrapped by the net 16. Moreover, the screeen 30 includes an upper end portion which is elevated relative to the top side of the raft 12 and is accessible, in a manner as will be clarified below, for being rotatably driven about the longitudinal axis of the screen 30.

Figure 3:
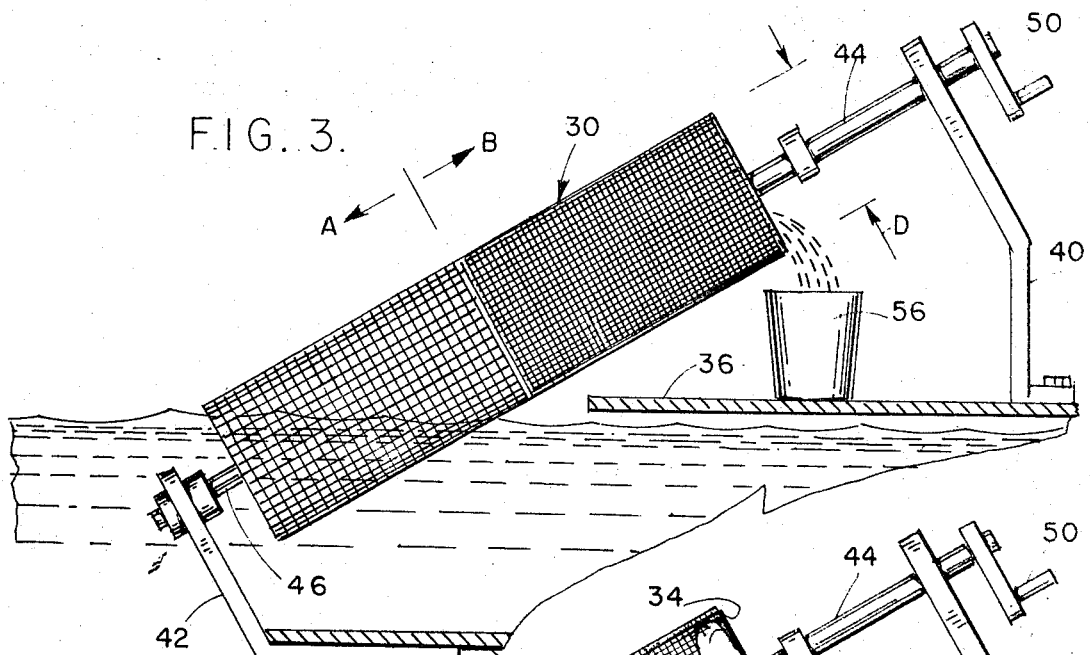
FIG. 3 illustrates a front elevational view, enlarged and partially in cross-section, of the manner by which the conveyer screen is rotatably supported upon a raft, only a fragment of the raft being illustrated.
Figure 4:
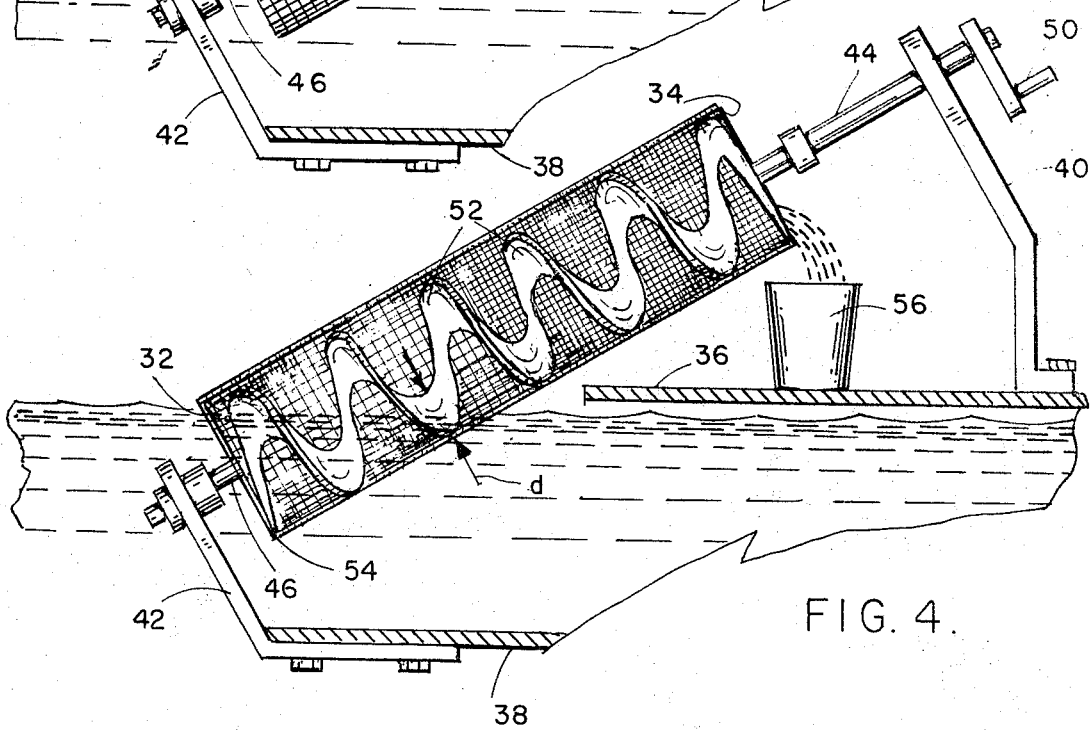
FIG. 4 illustrates a view similar to that of FIG. 2, however, a portion of the cylindrical screen is removed for exposing the helical conveyer member which is fixed internally to the screen.
Figure 5:
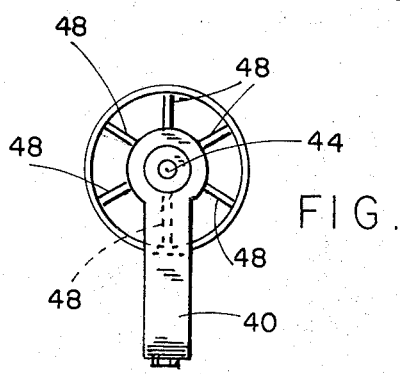
FIG. 5 illustrates an end view of the screen from a position on the raft which rotatably supports the screen.

Referring now to FIGS. 3 and 4, the raft 12 includes an upper platform 36 and a lower platform 38 extending in generally stepped relation with one another adjacent the sluice 14. An upper bracket 40 is fixedly connected to the upper platform 36, whereas a lower bracket 42 is fixedly connected to the lower platform 38. Fixedly connected in coaxial relation to the upper end portion 34 of the screen 30 and lower end portion 32 of the screen 30 are upper and lower shaft members 44 and 46 respectively, the latter shaft members being rotatably journaled in the brackets 40 and 42 respectively and fixed to the screen 30 such as by means of the spokes or ribs 48, in a manner as illustrated in FIG. 5.

Fixedly connected to the uppermost end portion of the shaft 44 is a crank 50 for permitting manual rotation of the shaft 44 and thereby the screen 30. Alternatively, the uppermost end portion of the shaft 44 may be driven such as by means of a motor, the latter which is preferable and generally driven at a rate of 45 R.P.M. such as by means of a one-quarter horsepower motor.

As illustrated in FIG. 4, the internal cylindrical wall of the conveyor screen 30 is fixedly provided with a helical conveyer member 52, the helical conveyer member 52 and the screen 30 being generally coextensive with one another. In this respect, the helical conveyer member 52 initiates at the lower end portion 32 at a point 54 for "bitting" into the shrimp concentrated and entrapped in the sluice 14, as the helical conveyer member 52 and screen 30 are simultaneously or commonly driven from the top side of the raft 12. Clearly, as those skilled in the art will readily understand, the common rotation of both the screen 30 and the helical conveyer member 52 causes an elevation and transferring of the entrapped shrimp from the sluice 14 to a position on the top side of the raft 12 for continuous expulsion into appropriate collection buckets 56 positioned directly below the upper end portion 34 of the screen 30.

It has been determined that it is most preferable to provide the helical conveyer member 52 with a uniform lateral extent, the extent generally denoted by the reference character d in FIG. 4 and being less than the radius of the cylindrical conveyer 30 and most preferably one-quarter of the diameter D illustrated in FIG. 3. The provision of the helical conveyer member 52 with a lateral extent which is substantially the equivalent of one-quarter the diameter D illustrated in FIG. 3 is to provide a concentric arrangement of openings along the rotational axis of the screen 30 so as to permit excessive shrimp to spill backwardly into the sluice 14 and thereby prevent either overloading of the motor drive for the screen 30 or alternatively obviate the requirement for great strength to manually rotate the screen 30 for elevating the shrimp entrapped therein.

Moreover, it has determined determind that it is most preferable to provide the screen 30 with a portion of coarse mesh, in the direction of arrow A in FIG. 3, and a portion of fine mesh, in the direction of arrow B in FIG. 3. The provision of these two portions of fine and coarse mesh permits excessive fluid entrenched in the shrimp initially to readily escape from the confines of the screen 30, whereas as the shrimp is progressively elevated by the helical conveyer member 52 out of the confines of, or immediately above, the surface level of the water, only a minimal quantity of water need escape from the confines of the screen 30 and, therefore, a fine mesh is used for exhausting the remaining water and insures the maintaining of the shrimp in the screen 30.

It has also been determined that more than one helical conveyer member 52 may be fixedly associated with the inner wall of the conveyer screen 30 for increasing the number of "bites" per revolution associated with the screen 30 and thereby increase the quantity of shrimp that can be simultaneously conveyed or transferred from the water surface to appropriate buckets on the raft.

The present invention is utilized generally by a shrimp harvester who, by means of an appropriate motor drive, directs the raft along the surface of a shrimp-laden body of water such that the net 16 skims the surface of the body of the water and entraps shrimp in the concentrated area or sluice 14 of the raft 12. The concentrated shrimp are then entrapped at the lower end portion 32 of the screen 30, the screen 30 being either manually or automatically driven rotatably so as to cause the helical conveyer member 52 to "bite" into the concentrated shrimp and transfer the latter helically along the inner wall of the screen 30 to the upper end portion 34 and expel the shrimp into appropriate buckets 56 positioned below the upper end portion 34 of the screen 30. Clearly, this is an extremely simple operation which may be effected continuously and quickly without any regard to the physical strength of the harvester, and without the requirement for changing nets which often results in a loss of shrimp.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. Apparatus for removing brine shrimp from a fluid, said apparatus comprising first means extending partially in said fluid for entrapping brine shrimp, second means extending partially in said fluid and drivingly supported for transferring entrapped brine shrimp along said first means and out of said fluid, third means drivingly associated with said second means for driving said second means and permitting expelling said brine shrimp from said first means, said second means including a helical member extending internally of said first means and terminating in opposite end portions of said first means, one of said end portions being submerged in said fluid, the other of said end portions extending free from said fluid for expulsion of brine shrimp, said helical member being fixedly connected to said first means internally of said first means.

2. Apparatus as claimed in claim 1, wherein said first means is fluid-pervious for permitting fluid to escape therefrom.

3. Apparatus as claimed in claim 2, wherein said first means includes a generally screened cylindrical wall.

4. Apparatus as claimed in claim 3, wherein the screened cylindrical wall includes a first portion submerged in said fluid and a second portion free from said fluid, said second portion having openings of smaller size than said first portion.

5. Apparatus as claimed in claim 1, including floatation means which supports said first means for permitting displacement of said first means along the surface of said fluid into entrapping relation with said brine shrimp.

6. Apparatus as claimed in claim 5, wherein said floatation means includes a sluice through which said first means projects into partially submerged relation in said fluid.

7. Apparatus as claimed in claim 6, wherein said floatation means includes a netted member at least partially submerged for skimming said fluid proximate the surface of the latter and communicating with both said sluice and said first means.

8. Apparatus as claimed in claim 1, wherein said first means is generally cylindrical and said helical member has a lesser lateral extent than the radius of said first means.

9. Apparatus as claimed in claim 1, including means for simultaneously rotating said first and second means along a common axis.

* * * * *